J. A. WALKER.
DRILL CHUCK.
APPLICATION FILED MAR. 24, 1910.
989,215.
Patented Apr. 11, 1911.
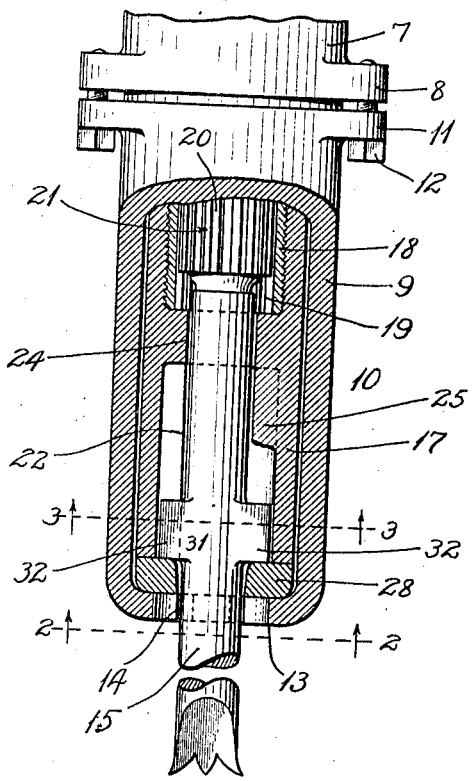
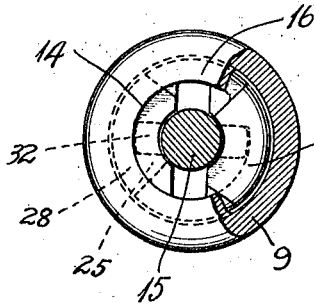
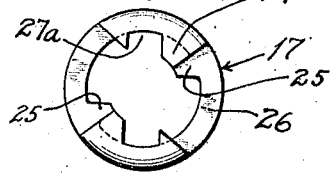
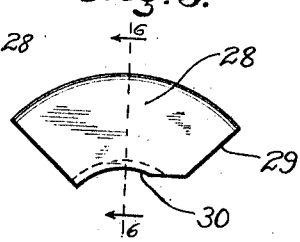
Witnesses.
E. R. Pollard
F. D. Ammen
Inventor.
James A. Walker.
By Hazard & Strauss
Attys.

UNITED STATES PATENT OFFICE.

JAMES A. WALKER, OF MONROVIA, CALIFORNIA.

DRILL-CHUCK.

989,215.   Specification of Letters Patent.   Patented Apr. 11, 1911.

Application filed March 24, 1910.   Serial No. 551,354.

*To all whom it may concern:*

Be it known that I, JAMES A. WALKER, a citizen of Great Britain, residing at Monrovia, in the county of Los Angeles and State of California, have invented new and useful Improvements in Drill-Chucks, of which the following is a specification.

This invention relates to drill chucks and is particularly applicable to drills such as pneumatic and steam drills, in which a blow is struck on the end of the drill bit or drill held in a chuck. In drills of this type the drill head presents lugs projecting in opposite directions, which assist in retaining the drill in the chuck and facilitate its being rotated on its axis as it advances in the material in which the hole is being formed. The concussion of the drill head on the chuck is severe particularly when the drill is being withdrawn and they frequently break at the point where the drill head rests.

The object of this invention is to provide a drill chuck of improved form having a construction tending to overcome the defect referred to and constructed in such a way that the breakage, if any occurs, shall be confined to a small part or segment, which can be replaced without involving the loss of the entire chuck socket or drill holder.

In the annexed drawing, which fully illustrates my invention, Figure 1 is a central vertical section and partial elevation of the drill chuck constructed according to my invention, certain parts being broken away.
Fig. 2 is a cross section taken on the line 2—2 through the drill and showing the lower end of the chuck partly in elevation and partly broken away. Fig. 3 is a cross section taken on the line 3—3 of Fig. 1. Fig. 4 is a bottom plan or end view of the drill socket, with the segments which take the shock of the drill head, removed. Fig. 5 is a plan of one of my segments showing the same removed. Fig. 6 is a cross section of one of the segments taken on the line 6—6 of Fig. 5.

Referring more particularly to the parts, 7 represents the lower end of the drill cylinder, which is provided with lugs 8 by means of which the case 9 of the drill chuck 10 is attached, the upper end of the case having lugs 11 connected with the lugs 8 by bolts 12, as shown. The lower end of the case 9 is formed with an integral head 13, and this head has a central opening 14 of circular form to receive the drill 15, so that an annular flange 16 is formed. Within the case 9 I provide a drill socket 17, which is of substantially cylindrical form, and in the upper end of this socket a threaded sleeve 18 is provided, having longitudinal grooves 19, and these grooves receive longitudinal flutes or ribs 20 formed on the lower end of the drill hammer 21. The lower end of the socket 17 is formed into a substantially cylindrical bore or chamber 22, the upper end of which is closed by a transverse wall or head 23, and through this head 23, an opening 24 is formed, through which the upper end of the drill 15 passes so that the lower end of the hammer can strike and rest upon the upper end of the drill, as shown in Fig. 1. The chamber or bore 22 is provided at diametrically opposite points with longitudinally extending ribs or dogs 25. Drills of this type comprise means for rotating the hammer 21, and this rotation of the hammer 21 is imparted to the drill socket 17 by reason of the flutes 20 in the grooves 19 so that as the hammer reciprocates the drill socket will be rotated with a step by step movement.

As indicated most clearly in Fig. 4, the lower end of the drill socket 17 is formed at diametrically opposite points with segmental recesses or pockets 26, and these pockets are formed on the ends of the aforesaid driving dogs 25. Between the pockets the material at the lower end of the socket extends inwardly so as to form segmental flanges 27, formed with diametrically opposite notches 27ª. In these pockets 26 I place segments or anvils 28, one of which is illustrated in detail in Figs. 5 and 6. These segments have end faces 29 which are radially disposed with respect to the axis of the socket so that they will fit neatly in the pockets and project inwardly like the flanges 27, so that they coöperate with the flanges 27 to form a complete inwardly projecting flange formed of sections. As indicated in Fig. 5, each segment presents an inner edge 30, which is curved like the inner edges of the flanges 27, and this edge lies close against the side of the drill, as will be readily understood. In this way an efficient guide opening is formed in the lower end of the socket by the flanges 27 and the segments. As indicated in Figs. 1 and 6, the inner edge 30 of each segment is beveled, that is, it inclines slightly away from the drill in an upward direction when the segment is in place.

The drill 15 is formed near its upper end into a cross-head 31, which presents oppositely projecting lugs 32. In placing the drill in position, the lugs 32 are alined with the notches 27ª, and the upper end of the drill is passed up through opening 14 into the chamber 22, the extreme upper end of the drill passing through the opening 24, so as to be within range of the blows of the hammer. A slight twist is then given to the drill 15, to bring the lugs 32 over the edges of the segments which overhang the opening 14 and against the dogs 25. The socket 17 can be rotated by the dogs 25, and in this way, the notches 27ª and lugs 32 will be kept out of register so that the lower edges of the lugs 32 will be maintained against the segments 28, so that the relation indicated in Fig. 3 will be maintained and the drill will be slightly rotated with each reciprocation of the hammer.

In using the drill, when the point of the drill is being withdrawn from the rock as the blow of the hammer is struck its force is not taken on rock but it tends to drive the drill forward; the forward movement of the drill is arrested by the lugs 32 striking the segment 28. The segments are retained in position by the head 13 of the case 9. These segments 28 are formed of hardened steel so that they are well adapted to receive the blow of the hammer without injury. On account of the relatively large surface which they present on their under side, they distribute the blow, which is of course imparted to the head 13. In this way they prevent the head 13 from being injured when the drill is in operation and particularly when it is being withdrawn, and if one of the segments should be injured it can be quickly replaced by a perfect one. The object of beveling the inner edges of the segments 29 is to prevent any tendency of the segments to form a "bur" on its upper side adjacent to the point where the lugs strike, as such a bur might tend to choke the opening through which the drill passes.

Having described my invention what I claim as new and desire to secure by Letters Patent is:

1. A drill chuck comprising a case having a head in the lower end thereof, a drill having a driving cross-head adapted to be passed up through said head, a drill socket adapted to receive said drill and guide the same, anvils disposed between said cross-head and said first head and adapted to take the direct blow from said cross-head.

2. A drill chuck having a case with a head in the lower end thereof, a socket mounted within said case, a drill having a cross-head disposed within said socket to retain the drill, said socket having notches in the lower end thereof, and members retained in said notches and adapted to receive the blow of said cross-head and arrest the forward movement of the drill when struck by the hammer.

3. A drill chuck comprising a case having a lower head with an opening through which the drill may pass upwardly, a drill having a head with lugs adapted to be passed upwardly through said head, a socket within said case adapted to receive said cross-head, removable members between said socket and said head, and means for holding said removable members against angular displacement, said removable members being adapted to receive the force of the blow by said lugs when said drill is struck by the hammer.

In witness that I claim the foregoing I have hereunto subscribed my name this 19th day of March, 1910.

JAMES A. WALKER.

Witnesses:
 ETHEL COLEMAN,
 EDMUND A. STRAUSE.